Figure 4:
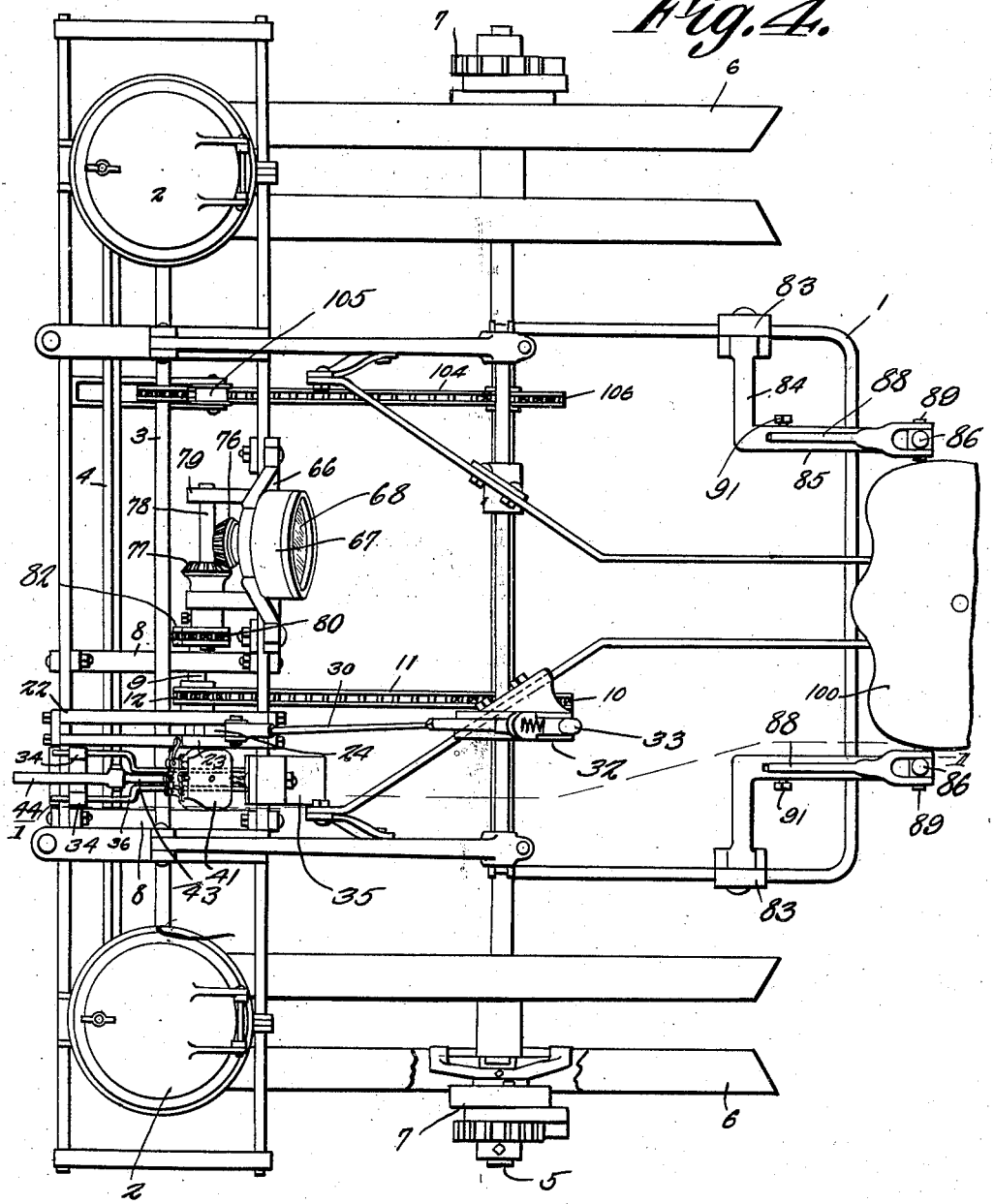

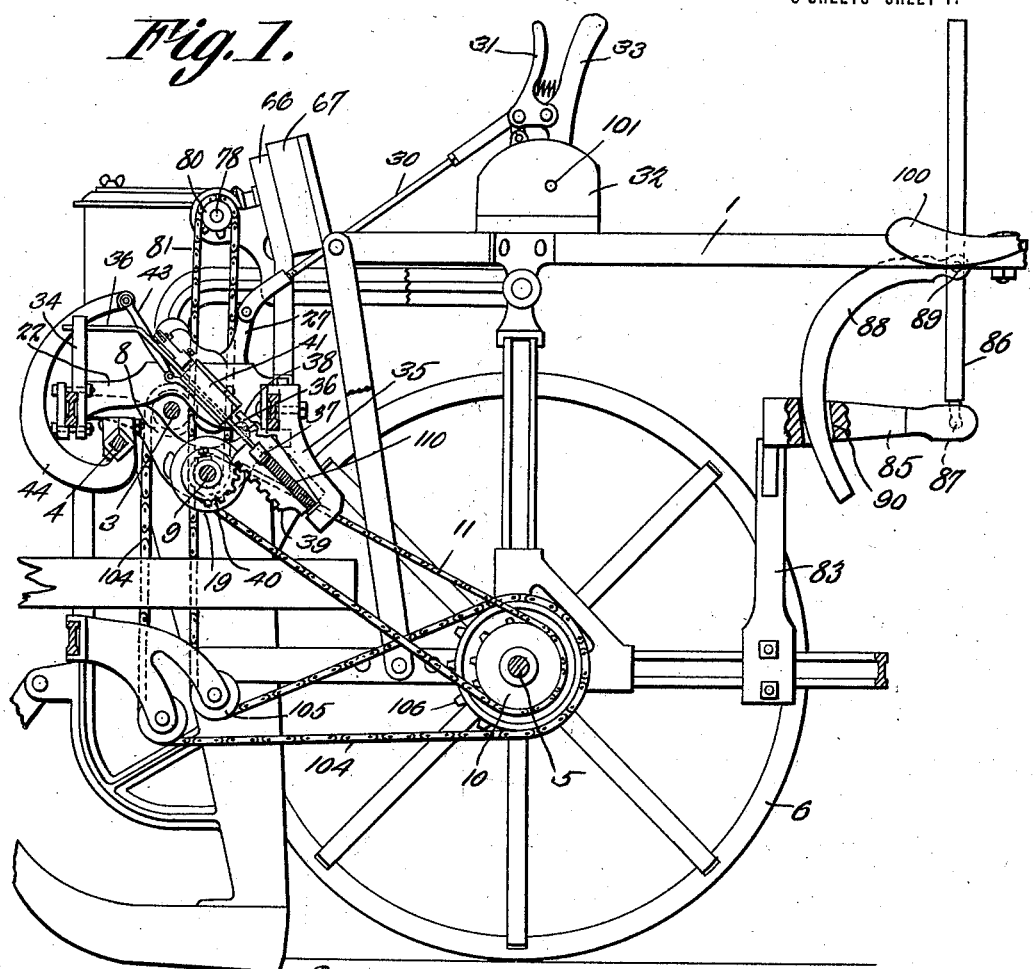

C. W. SMITH.
PLANTER ATTACHMENT.
APPLICATION FILED JAN. 4, 1919.

1,321,339.

Patented Nov. 11, 1919.
3 SHEETS—SHEET 2.

Witness

Inventor,
C. W. Smith
By C. A. Snow & Co.
Attorneys.

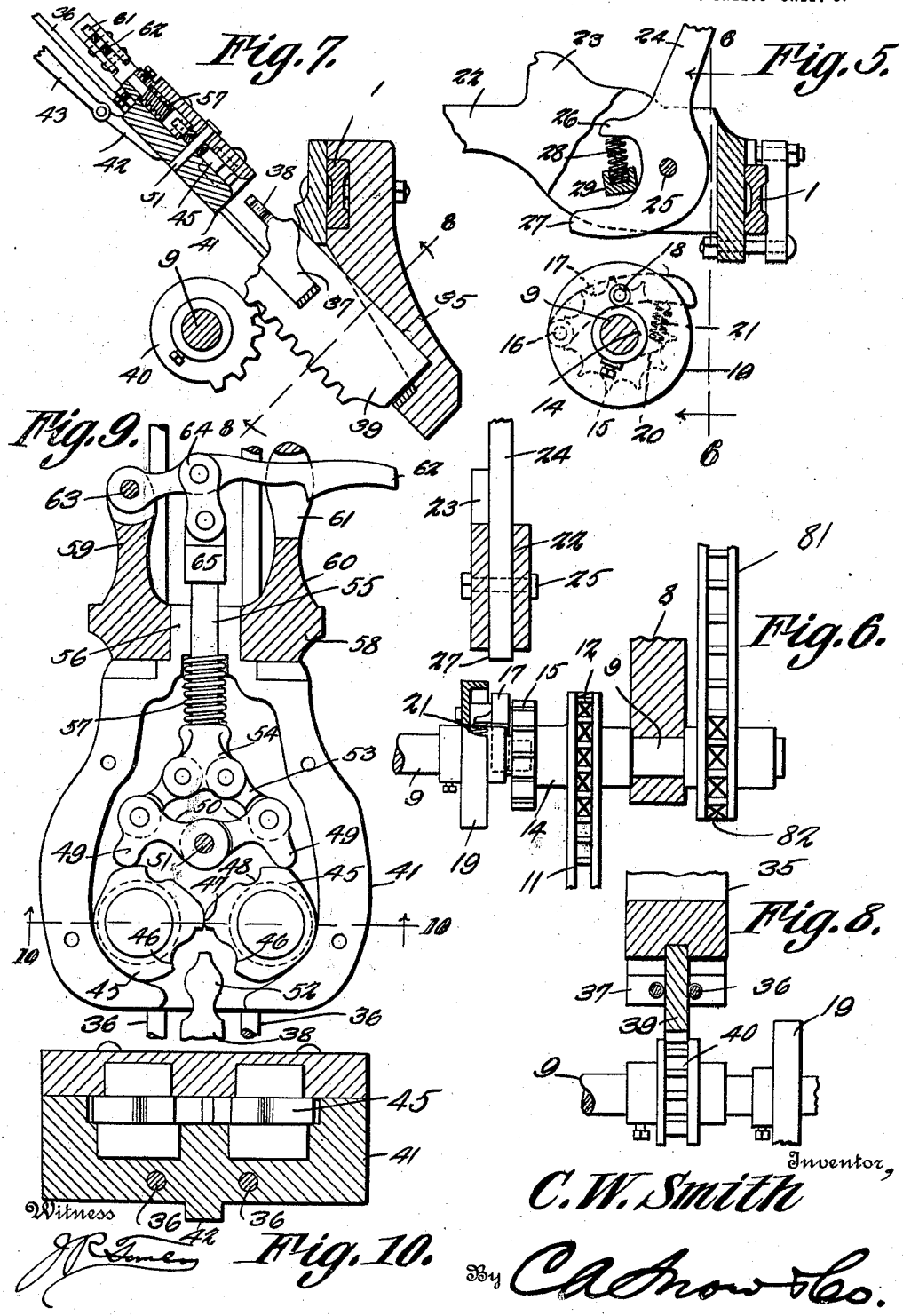

UNITED STATES PATENT OFFICE.

CHARLES W. SMITH, OF GRAYDON SPRINGS, MISSOURI.

PLANTER ATTACHMENT.

1,321,339.  Specification of Letters Patent.  Patented Nov. 11, 1919.

Application filed January 4, 1919. Serial No. 269,605.

*To all whom it may concern:*

Be it known that I, CHARLES W. SMITH, a citizen of the United States, residing at Graydon Springs, in the county of Polk and State of Missouri, have invented a new and useful Planter Attachment, of which the following is a specification.

The device forming the subject matter of this application is adapted to be attached to a planter for the purpose of dropping the seed at proper intervals.

One object of the invention is to provide novel means whereby the dropper shaft may be actuated.

Another object of the invention is to provide novel means whereby the driver of the vehicle can re-locate the vehicle, in order to secure proper alinement in the rows when a deviation, about a stump or otherwise, has been made.

Another object of the invention is to improve the sight-pole construction.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in vertical section, a device constructed in accordance with the invention, most parts appearing in elevation; Fig. 2 is an elevation showing the dial mechanism; Fig. 3 is a section on the line 3—3 of Fig. 2; Fig. 4 is a top plan of the machine; Fig. 5 is a sectional detail illustrating the mechanism under the control of an operator, whereby the dropping means may be regulated at will; Fig. 6 is a section on the line 6—6 of Fig. 5; Fig. 7 is a sectional detail illustrating the rider and attendant parts; Fig. 8 is a section taken on the line 8—8 of Fig. 7; Fig. 9 is an elevation showing the lock, parts thereof being removed; and Fig. 10 is a section on the line 10—10 of Fig. 9.

The numeral 1 designates generally, the frame of a planter, carrying seed hoppers 2 and provided with a shaft 3 for feeding the seed from the hoppers. The numeral 4 marks a rock shaft, connected with the dropping mechanism. The seat of the vehicle is denoted by the numeral 100. The device forming the subject matter of this application is adapted to be used with planters of various kinds, but, by way of illustration, parts above enumerated have been reproduced from Patent No. 1,131,897 granted on March 16, 1915 to J. B. Bartholomew, for sundry improvements in an agricultural machine, that patent having been assigned to the Avery Company, a corporation of Illinois, and the machine shown in the patent being known to the trade as the "Avery" machine. Although the device forming the subject matter of this application may be used with planters of various kinds, the allusion above to the Avery machine will constitute a useful index to the general type of planter wherein the invention may be embodied.

An axle 5 is journaled for rotation in the frame 1, ground wheels 6 being journaled on the axle. The ground wheels 6 are connected to the axle 5 by pawl and ratchet mechanisms 7, which may be constructed as desired, the structure being such that when a forward rotation is imparted to the ground wheels 6, the axle 5 will be rotated, whereas, if the ground wheels 6 be rotated rearwardly, then the axle 5 will not be rotated.

A pair of depending brackets 8 is secured to the frame 1 adjacent to the forward portions thereof, and in the brackets 8, a shaft 9 is journaled. A sprocket wheel 10 is mounted on the axle 5 and coöperates with a sprocket chain 11, engaged, as indicated in Fig. 6, with a sprocket wheel 12 on a sleeve 14, the sleeve being loosely mounted on the shaft 9. A means is provided whereby the sleeve 14 normally is coupled to the shaft 9 to rotate therewith, and, with this end in view, the sleeve is provided at one end with a ratchet wheel 15 adapted to engage a roller 16 on a pawl 17 fulcrumed intermediate its ends at 18 on a disk 19 secured to the shaft 9. The disk 19 has a lug 20 engaging one end of a compression spring 21, the other end of the spring coöperating with the pawl 17 to hold the roller 16 in engagement with the ratchet wheel 15, so that when the sleeve 14 is rotated from the axle 5 by means of the sprocket chain 11, the shaft 9 will be rotated also.

A two-part support 22 is mounted on the frame 1 between the brackets 8 and projects upwardly, one member of the support having a lug 23. A lever 24 is fulcrumed at 25 between the parts of the support 22 and includes an upper finger 26 and a lower finger 27. A compression spring 28 coöperates with the upper finger 26 and with a cross piece 29 connecting the constituent parts of the support 22, the function of the spring 28 being to swing the lever 24 so that the lower finger 27 does not coöperate with the rear end of the pawl 17, the finger 27 and the pawl 17 having a coöperating relation which will be explained hereinafter. By means of a longitudinally adjustable connection 30, the upper end of the lever 27 is connected pivotally with a latch lever 31 coöperating with a keeper 32 carried by the frame 1 and adapted to coact with the keeper, to hold in adjusted positions, a hand lever 33 to which the latch lever 31 is pivoted, the hand lever being fulcrumed at 101 on the keeper 32.

Standards 34 are secured to the forward portion of the frame 1 between one of the brackets 8 and the support 22. A depending hanger 35 is assembled with the frame 1 to the rear of the standards 34. In the standards 34 and in the hanger 35, rearwardly and downwardly extended guides 36, in the form of rods, are mounted.

A rider is mounted to reciprocate on the guides 36, and includes a cross head 37 mounted immediately on the guides, retractile springs 110 being mounted on the guides 36, the ends of each spring being connected to the cross head and to the rear portion of the hanger 35. The cross head carries a forwardly presented keeper 38, including a head 52, shown best in Fig. 9, the head 52 being, roughly stated, of spear shape. The cross head 37 of the rider carries a rack bar 39 meshing into an interrupted pinion 40 secured to the shaft 9.

A lock casing 41 is slidable on the guides 36 in front of the cross head 37 and is provided on its bottom with a rib 42, whereunto the rear end of a link 43 is pivoted, the forward end of the link being pivoted to a curved arm 44 secured to the dropper or rock shaft 4. At this point, it may be observed that the shaft 3 is driven by a sprocket chain 104 coöperating with idlers 105 on the frame 1, the chain 104 being engaged around the sprocket 106 on the axle 5.

The lock casing 41 incloses a mechanism for engaging the keeper 38 on the slidable cross head 37, this mechanism, preferably embodying a pair of rotary latches 45 located in the casing 41 and journaled therein, the latches having recesses 46 adapted to coöperate with the head 52 of the keeper 38, there being lugs 47 on the latches 45, at the inner ends of the recesses 46, as Fig. 9 will show clearly. In the peripheries of the rotary latches 45 there are seats 48 adapted to coact with the angular ends 49 of retainers 50, the inner ends of which are pivoted on a post 51 located within the casing 41. Links 53 connect the retainers 50 with a head 54 on a plunger 55 mounted to slide in a bearing 56 of tubular form, on the rear end of the lock casing 41. If, as shown in Fig. 10, the lock casing is made in coacting parts, the bearing may be divided longitudinally, one portion of the bearing being located on each of the parts of the lock casing. A compression spring 57 abuts at one end against the head 54, and abuts at its other end against the bearing portion 56 of the lock casing 41. A U-shaped member 58 is seated upon and secured to the bearing 56 and constitutes, to all intents and purposes, a part of the lock casing 41. The U-shaped member 58 comprises arms 59 and 60, the arm 60 having an opening 61 wherein is located a lever 62 pivoted at 63 to the arm 59. At this point it may be mentioned incidentally that the free end of the lever 62 is adapted to coöperate, in a way to be described hereinafter, with the lug 23 on the support 22, shown in Fig. 5. Links 64 connect the intermediate portion of the lever 62 with a head 65 on the rear end of the plunger 55.

A bracket 66 is mounted on the frame 1 in front of the seat 100 the bracket carrying a casing 67. The casing 67 includes a transparent plate 68 behind which is held a pointer 69 coöperating with a dial 70 held by a hub 71, cotter pins 72 and a screw 73, on a shaft 74 journaled in the casing. The hub 71 may be supplied with a dial 75; the dials 70 and 75 being graduated in any desired way, to show the distance between the rows which are being planted. The shaft 74 carries a beveled pinion 76 meshing into a beveled pinion 77 on a shaft 78 journaled in bearings 79 on the bracket 66. There is a sprocket wheel 80 on the shaft 78, and about the sprocket wheel is trained a sprocket chain 81 coacting with a sprocket wheel 82 on the shaft 9.

A pair of upstanding supports 83 are attached to the rear portion of the frame 1, the supports including inwardly projecting parts 84 having rearwardly extended arms 85. Sight poles 86, located on opposite sides of the seat 100, are pivoted at 87 to the rear ends of the arms 85. The rear ends of arcuate supports 88 are pivoted at 89 to the sight poles 86, the forward ends of the supports operating in slots 90 in the arms 85. Set screws 91 are threaded into the arms 85 and bear upon the supports 88.

In practical operation, when the vehicle moves forwardly, the ground wheels 6 rotate the axle 5 through the instrumentality of the pawl and ratchet mechanisms 7. From the axle 5, the sprocket wheel 10, the sprocket chain 11, the sprocket wheel 12, the sleeve 14, the ratchet wheel 15, the pawl 17 and the disk 19 impart rotation to the shaft 9. When the shaft 9 is rotated, the interrupted pinion 40 is rotated, the pinion meshing into the rack bar 39 and advancing the rider of which the cross head 37 constitutes a part, the rider sliding on the guides 36, and the springs 110 being put under tension. The keeper 38 enters the lock casing 41, the point of the keeper engaging the lugs 47 on the latches 45 and rotating the latches until the angular ends 49 of the retainers 50 engage in the seats 48, under the thrust of the spring 57. The recesses 46 in the latches 45 receive the side portions of the head 52 of the keeper 38 and the lock casing 41 is coupled up to the rider 37—39. The lock casing 41 now advances along with the rider until the teeth on the interrupted pinion 40 are out of mesh with the rack bar 39. Then the springs 110 exert themselves, and draw the rider 37—39 and the lock casing 41 rearwardly, the rack bar 39 being permitted to move rearwardly, independently of the pinion 40, because that pinion is an interrupted pinion. It will be understod that during the forward and rearward movement of the lock casing 41, as above explained, the link 43 which is pivoted to the lock casing will operate the shaft 4, through the instrumentality of the arm 44, and effect a dropping of the seed at the proper time.

When the lock casting 41 slides rearwardly, in coupled relation to the rider 37—39, the outer end of the lever 62 ultimately engages the lug 23 on the fixed support 22. When the lever 62 is tilted, during this operation, the links 64 retract the plunger 65, and the links 53 tilt the retainers 50, the angular ends 39 of the retainers moving out of the seats 48 in the rotary latches 45. The backward pull of the springs 110 on the rider 37—39 causes the head 52 of the keeper 38 to ride out of the recesses 46 in the latches 45, the latches being rotated until the lugs 47 abut, the angular ends 49 of the retainers 50 resting on the peripheries of the latches 45 to one side of the seats 48, the parts thus being restored to the positions shown in Figs. 9 and 7.

The mechanism above alluded to, and the operation last above set forth, provides for an automatic dropping of the seed at spaced intervals. Suppose, however, that it is desired to stop the action of the seed dropping mechanism, or control that mechanism by hand. Then the operator manipulates the lever 33 and the latch lever 31, motion being transmitted to the lever 27 by way of the connection 30. The spring 28 (Fig. 5) is compressed and the lower finger 27 on the lever moves into the path of the pawl 17, tilting the pawl on its fulcrum 18, and withdrawing the roller 16 from engagement with the ratchet wheel 15. Now, the sleeve 14 is free to rotate on the shaft 9, and even though the sleeve be rotated from the axle by the sprocket chain 11 and the sprocket wheel 10, together with the sprocket wheel 12 no rotation will be imparted to the shaft 9, and, consequently, the interrupted pinion 40, the rider 27—29, and coacting parts, will remain at rest.

From the shaft 9, motion is transmitted by way of the sprocket wheel 82, the sprocket chain 81 and the sprocket wheel 80 to the shaft 78. From the shaft 78, the intermeshing beveled pinions 77 and 76 operate the shaft 74, the dials 70 and 75 moving with respect to the index or pointer 69. The operator, therefore, has at all times before him a visible means for determining precisely where the machine is located. It will be clear that the mechanism above alluded to permits the machine and its mechanism to be set properly, after a deviation or interruption of any kind, such as may occur, for instance, when the machine detours around a stump, rock or other obstacle.

The set screws 91 may be loosened, permitting the arcuate supports 88 to move in the slots 90 of the arms 85, the sight poles 86 tilting on their pivotal mountings 87. In this way, the sight poles may be adjusted, and by tightening the set screws 91, the sight poles will be held in adjusted positions. A pair of stakes or poles may be set in the ground, at the side of the machine, and the operator, looking laterally in either direction, may line up either of the sight poles 86 with the corresponding sight poles in the ground. This operation will be clearly understood by those skilled in the art and may be varied as occasion may demand.

Having thus described the invention, what is claimed is:—

1. A planter having a guide; a rider mounted to slide on the guide; a locking mechanism slidable on the guide and having means for engaging the rider; a ground wheel; means for operatively connecting the ground wheel with the rider; a dropper shaft; means for operatively connecting the locking mechanism with the dropper shaft; and means coöperating with the locking mechanism to release the same from the rider at a point in the travel of the locking mechanism on the guide.

2. A planter having a guide; a rider mounted to slide on the guide; a locking mechanism slidable on the guide and having means for engaging the rider; a ground wheel; means for operatively connecting the ground wheel with the rider to move the rider and the locking mechanism in one direction; spring means for moving the rider in an opposite direction; a dropper shaft;

means for operatively connecting the locking mechanism with the dropper shaft; and means coöperating with the locking mechanism to release the same from the rider at a point in the travel of the locking mechanism on the guide.

3. In a planter, an axle; a ground wheel thereon; a shaft; means for connecting the shaft with the axle; an interrupted pinion on the shaft; a guide; a rider mounted to slide on the guide and including a rack coöperating with the interrupted pinion to move the rider in one direction; spring means for moving the rider in an opposite direction; a locking mechanism slidable on the guide and having means for engaging the rider; a dropper shaft; means for operatively connecting the dropper shaft with the locking mechanism; and means coöperating with the locking mechanism to release the same from the rider at a point in the travel of the locking mechanism on the guide.

4. A planter comprising an axle; a ground wheel on the axle; a shaft; means for operatively connecting the shaft with the axle; mechanism under the control of an operator for disconnecting said means from the axle; a guide; a rider mounted to slide on the guide; means for actuating the rider intermittently in one direction from the shaft; spring means for operating the rider intermittently in an opposite direction; a locking mechanism slidable on the guide and having means for engaging the rider; a dropper shaft; means for operatively connecting the locking mechanism with the dropper shaft; and means coacting with the locking mechanism to release the same from the rider at a point in the travel of the locking mechanism on the guide.

5. A planter comprising an axle; a ground wheel on the axle; a shaft; means for operatively connecting the shaft with the axle; mechanism under the control of an operator for disconnecting said means from the shaft; a guide; a rider mounted to slide on the guide and including a rack; an interrupted pinion on the shaft and meshing into the rack, the pinion constituting means for moving the rider in one direction; spring means for moving the rider in an opposite direction; a locking mechanism slidable on the guide and having means for engaging the rider; a dropper shaft; means for operatively connecting the dropper shaft with the locking mechanism; and means coöperating with the locking mechanism to release the same from the rider at a point in the travel of the locking mechanism on the guide.

6. A planter comprising a dropper shaft; an arm on the dropper shaft; a guide; a locking mechanism slidable on the guide; a link connecting the locking mechanism with the arm; a movable member adapted to be engaged by the locking mechanism; means for releasing the locking mechanism from said member at a point in the travel of the locking mechanism on the guide; a ground wheel; and means for connecting the movable member with the ground wheel.

7. A planter comprising a guide; a rider mounted to reciprocate on the guide; a ground wheel; means for operatively connecting the rider with the ground wheel; a dropper shaft; mechanism for locking the dropper shaft to the rider to secure rotation of the dropper shaft by the rider; and means for disengaging the locking mechanism automatically from the rider.

8. A planter comprising a shaft; a ground wheel; means for operatively connecting the ground wheel with the shaft; an interrupted pinion on the shaft; a guide; a rider mounted to reciprocate on the guide and including a rack meshing into the pinion, the rack and the pinion constituting means for moving the rider in one direction; spring means for moving the rider in an opposite direction; a locking mechanism mounted to slide on the guide and including means for engaging the rider; means for disengaging the locking mechanism from the rider from a point in the travel of the locking mechanism on the guide; a dropper shaft; an arm carried by the dropper shaft; and means for connecting the arm with the locking mechanism.

9. A planter comprising a reciprocating rider and a reciprocating locking mechanism having means for engaging the rider; means for disengaging the locking mechanism from the rider at a point in the travel of the rider; a ground wheel; a dropper shaft; means for operatively connecting the ground wheel with the rider; and means for operatively connecting the dropper shaft with the locking mechanism.

10. A planter comprising as coöperating parts, a reciprocating rider, and a reciprocating locking mechanism having means for engaging the rider; means for disengaging the locking mechanism from the rider at a point in the travel of the locking mechanism; a ground wheel; a dropper shaft; means for connecting one of said coöperating parts operatively with the ground wheel; and means for connecting the other of said coöperating parts operatively with the dropper shaft.

11. A planter comprising a frame; an arm on the frame and provided with an opening; a sight pole pivoted to the arm; a support pivoted to the sight pole and operating in the opening; and a clamping device carried by the arm and coacting with the support.

12. A planter comprising a shaft; a ground wheel; means for operatively connecting the ground wheel with the shaft; an indicating mechanism; means for operating the indicating mechanism from the shaft; a guide; a rider mounted to reciprocate on the guide; means for operating the rider intermittently from the shaft; a locking mechanism slidable on the guide and having means for engaging the rider; a dropper shaft; means for operatively connecting the locking mechanism with the dropper shaft; and means coöperating with the locking mechanism to disengage the same from the rider at a point in the travel of the locking mechanism on the guide.

In testimony that I claim the foregoing as my own, I have hereto affixed my signature in the presence of two witnesses.

CHARLES W. SMITH.

Witnesses:
R. TILLMAN JONES,
W. H. JONES.

Copies of this patent may be obtained for five cents each, by addressing the "Commissioner of Patents, Washington, D. C."